June 21, 1960 F. J. MIDDLESTADT 2,941,303
UNIVERSAL LOCATING FIXTURE
Filed Oct. 3, 1958 2 Sheets-Sheet 1

INVENTOR
Fred Middlestadt
BY Walter G. Finch
ATTORNEY

June 21, 1960

F. J. MIDDLESTADT 2,941,303

UNIVERSAL LOCATING FIXTURE

Filed Oct. 3, 1958

2 Sheets-Sheet 2

INVENTOR

Fred Middlestadt

BY Walter G. Finch

ATTORNEY

United States Patent Office 2,941,303
Patented June 21, 1960

2,941,303

UNIVERSAL LOCATING FIXTURE

Fred J. Middlestadt, 602 Kingston Road, Baltimore, Md.

Filed Oct. 3, 1958, Ser. No. 765,117

1 Claim. (Cl. 33—174)

This invention relates generally to universal locating fixtures. And more particularly, this invention pertains to a work-locating drill jig for squaring up work and precisely locating various points thereon with relation to each other.

In many kinds of machine work it has been the practice to locate drilling or machining points by scribing reference lines therefor. This is a time-consuming operation which repetitively accomplishes the same thing in job to job; namely, a squaring and setting up of reference dimension lines.

It is, therefore, an object of this invention to provide a precisely arranged dimensional grid fixture on which work can be oriented and precisely positioned in two dimensions in a plane.

Figure 1:
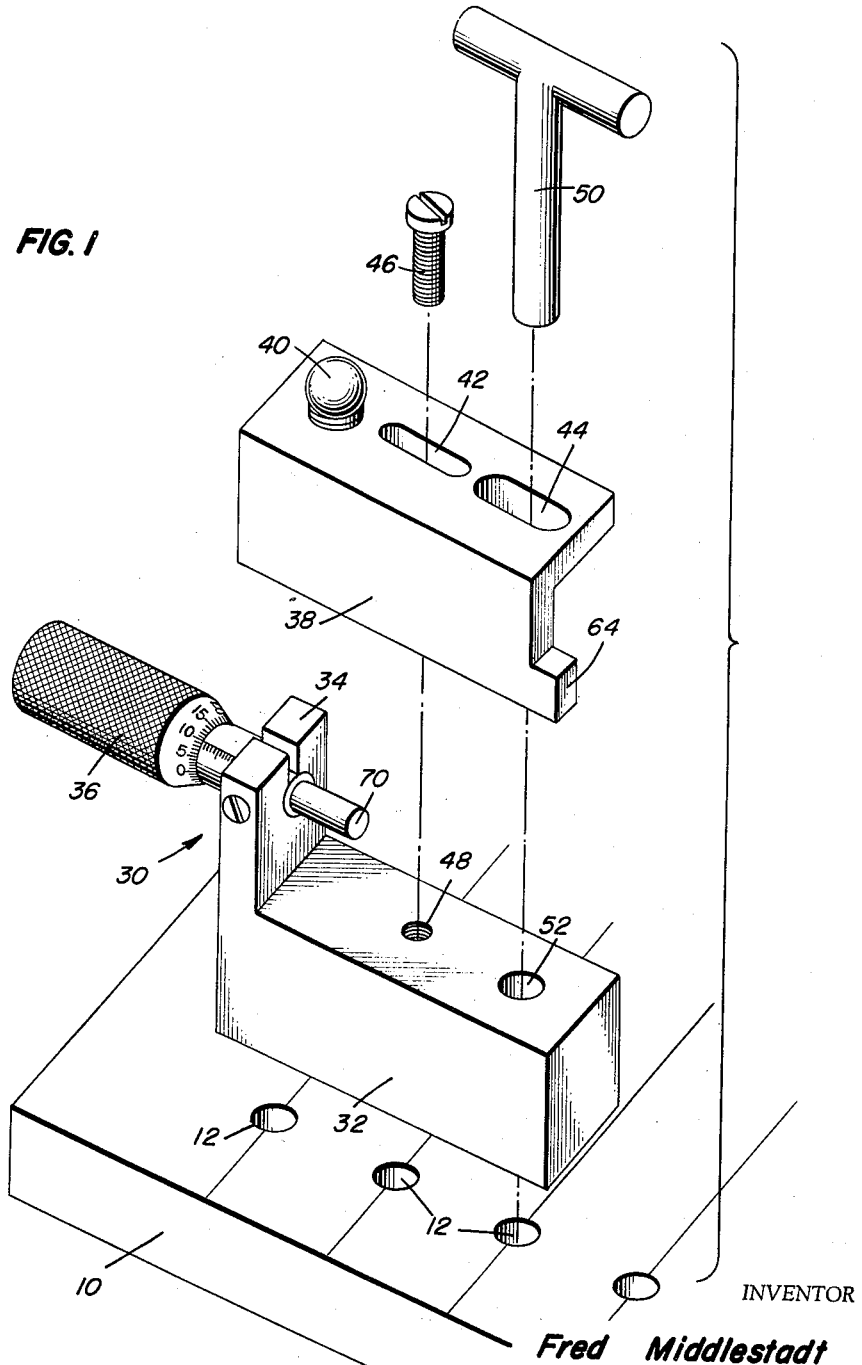
Figure 2:
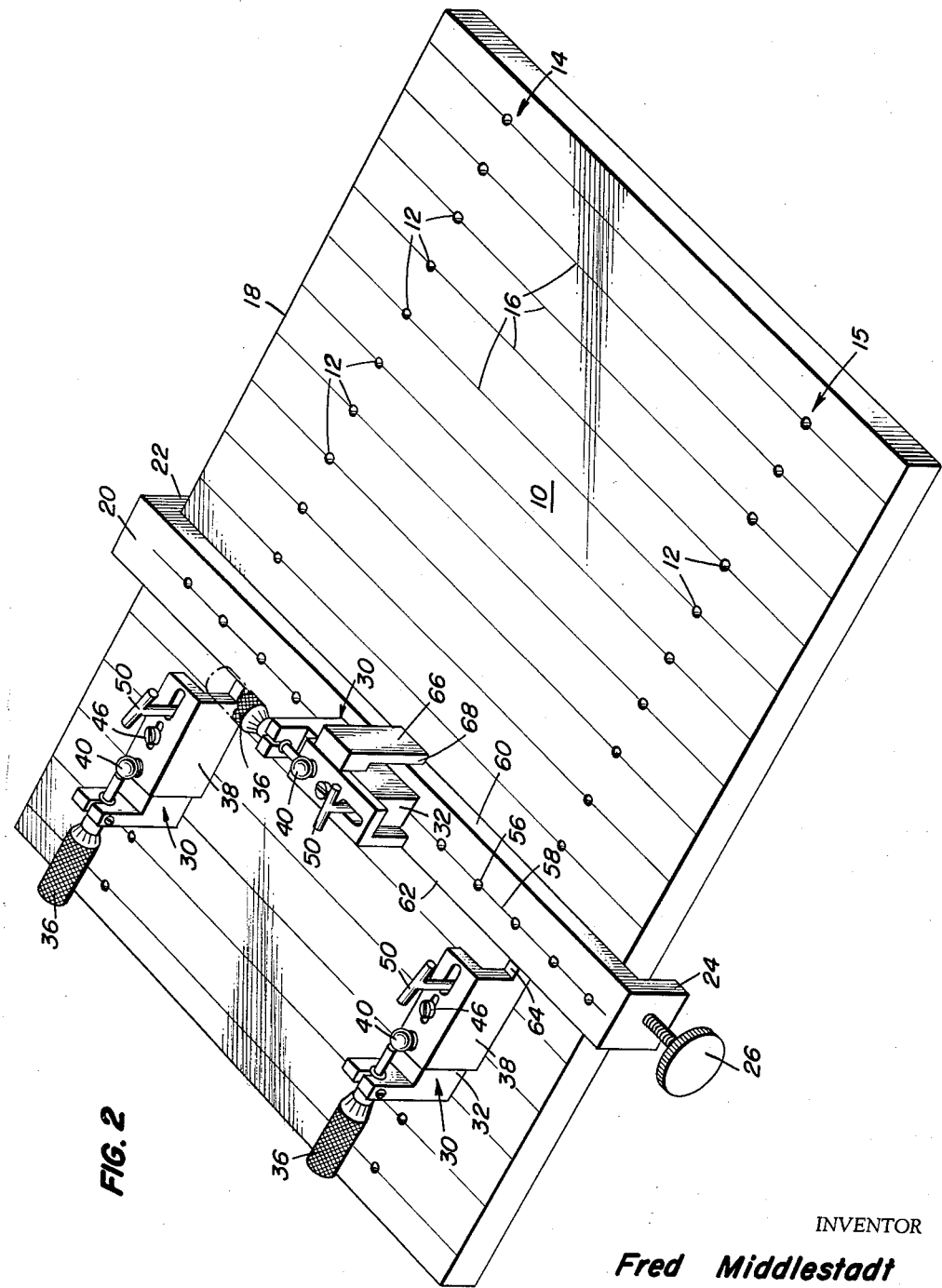

These and other objects and advantages of this invention will become more readily apparent and understood from the accompanying specifications and drawings in which:

Fig. 1 is an exploded view, in perspective, illustrating the relationship of the parts for a gauge block used in Fig. 2; and Fig. 2 is a perspective drawing of a universal locating fixture incorporating features of this invention.

Referring now to the details of the drawings, there is shown in Fig. 1, a foot 32 for a gauge block 30. Foot 32 is provided with a lip 34 which is slotted and drilled to receive a micrometer head 36. A slide 38, having a generally L-shaped cross-section, is arranged to slide upon foot 32. Slide 38 has fixed to it an anvil ball 40, and it is also provided with two longitudinal slots 42 and 44. By means of a headed screw 46 passed through slot 42 into a threaded hole 48 in foot 32, slide 38 is arranged so as to be free to slide longitudinally upon foot 32. A locating pin 50 is provided and passes through slot 44 and through a close-fitting hole 52 in foot 32 to be received by another close-fitting hole 12 in a plate 10.

As illustrated in Fig. 2, the plate 10 is a rectangular flat steel sheet having an accurately machined straight edge 18. A plurality of evenly spaced drilled holes 12 are provided in two spaced rows 14 and 15 parallel to edge 18. Furthermore, holes 12 are accurately located upon lines 16 which are perpendicular to side 18 and spaced one from the next by equal intervals such as one inch.

A steel crosshead 20 has a foot 22 arranged to bear against side 18 and spans plate 10. An opposite bracket 24 is provided with a thumbscrew 26 for securing the crosshead 20 at any desired longitudinal location on the surface of plate 10.

A row of holes 56, spaced one from the next by the above-mentioned selected equal interval, are located on a line 58 which is parallel to the two parallel sides 60 and 62 of crosshead 20. Holes 56 are drilled close-fitting for receiving pins 50.

Three gauge blocks 30 are used in the locating process. Two blocks 30 are fitted with stops 64 at the ends of slides 38. Pins 50 locate and secure the blocks to plate 10. The third block 30 is provided with a stop 66 on the side of slide 38 and in use pin 50 locates and secures it to crosshead 20.

It can be seen that the pair of blocks 30 can be located on plate 10 at exact one-inch intervals as defined by holes 12 therein. Moreover, fractional parts of an inch can be accurately imparted to slides 38 by means of micrometer heads 36 bearing against anvil balls 40. Stops 64, therefore, precisely position side 62 and consequently parallel side 60 of crosshead 20. Thus, any work placed against side 60 can be dimensionally referenced in a lateral direction.

An edge 68 of stop 66 similarly serves to transversely locate work placed thereagainst with holes 56 defining the inch intervals and micrometer 36 on the crosshead-located gauge block 30 defining the fractional parts of an inch.

While there has been here described and illustrated a preferred form of the invention, it is apparent that certain variations may be made without departing from the spirit thereof. Accordingly, limitation is sought only in accordance with the scope of the following claim.

What is claimed is:

A universal locating fixture, comprising, a base structure having at least two of its opposite sides parallel, said base structure having two rows of corresponding, evenly spaced holes provided therein, said rows of holes being positioned parallel to said parallel opposite sides of said base structure, with each corresponding pair of holes in said two rows of holes being arranged along an axis perpendicular to said parallel opposite sides of said base structure, a crosshead extending from the parallel opposite sides of said base structure and having downwardly extending arms at opposite ends thereof for engaging said parallel opposite sides thereof, said crosshead having a row of evenly spaced holes provided along its longitudinal axis and arranged perpendicular to said opposite parallel sides of said base structure, a gauge block positioned in each of said two rows of holes in said base structure as well as in said row of holes in said crosshead for dimensionally referring any work placed against said crosshead, each said gauge block having a substantially rectangular shaped base with an upwardly extending slotted lip at one end thereof, an L-shaped slide with an element for locating the gauge block with respect to said crosshead and having its leg portions mounted for sliding engagement with the top and one side of said base, the leg portion of said slide in engagement wtih the top of said base having a pair of spaced longitudinally extending slots provided therein, an anvil ball positioned on said slotted leg portion and in alignment with said pair of slots but spaced therefrom, means extending through one of said pair of slots and fixedly engageable by said base of said gauge block for securing said slide with respect to said base, and means extending through the other of said pair of slots and through said base and engageable in one of the holes in its corresponding row of holes for locating the gauge block with respect to said base structure, and a micrometer mechanism positioned in the slot in the upwardly extending lip of the base and having an adjustable member arranged to contact the anvil ball of its slide to measure the distance between any two succeeding holes in the row of holes in which the gauge block is positioned, and means including a screw mechanism for locking said crosshead in fixed position with respect to said base structure.

References Cited in the file of this patent

UNITED STATES PATENTS

| | | |
|---|---|---|
| 1,596,618 | Morrill | Aug. 17, 1926 |
| 2,131,323 | Huebner | Sept. 27, 1938 |
| 2,207,625 | Lester | July 9, 1940 |
| 2,342,033 | Barabas | Feb. 15, 1944 |
| 2,565,608 | Hoff | Aug. 28, 1951 |